United States Patent
Deng et al.

(10) Patent No.: US 12,316,356 B2
(45) Date of Patent: May 27, 2025

(54) SIGNAL PROCESSING DEVICE

(71) Applicant: INDUSTRIAL TECHNOLOGY RESEARCH INSTITUTE, Hsinchu (TW)

(72) Inventors: Juinn-Horng Deng, Taoyuan (TW); Yuan-Pei Wang, Kaohsiung (TW); Chung-Lien Ho, Zhubei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 407 days.

(21) Appl. No.: 17/993,103

(22) Filed: Nov. 23, 2022

(65) Prior Publication Data

US 2024/0120955 A1  Apr. 11, 2024

(30) Foreign Application Priority Data

Oct. 11, 2022 (TW) .................................. 111138438

(51) Int. Cl.
  *H04B 1/04* (2006.01)
  *H04B 7/06* (2006.01)
(52) U.S. Cl.
  CPC ............. *H04B 1/04* (2013.01); *H04B 7/0639* (2013.01); *H04B 2001/0425* (2013.01)
(58) Field of Classification Search
  CPC .................. H04B 1/04; H04B 7/0639; H04B 2001/0425; H04B 1/0475;

(Continued)

(56) References Cited

U.S. PATENT DOCUMENTS

2013/0064325 A1 * 3/2013 Kilambi ................ H03F 1/3241
                                                                      375/297
2021/0367564 A1 * 11/2021 Hausmair ............... H03F 3/189
(Continued)

FOREIGN PATENT DOCUMENTS

CN         112803972 A    5/2021
TW          I542139 B    7/2016

OTHER PUBLICATIONS

Abdelhafiz et al., "A High-Performance Complexity Reduced Behavioral Model and Digital Predistorter for MIMO Systems With Crosstalk", IEEE Transactions On Communications, vol. 64, No. 5, May 2016, pp. 1996-2004.

(Continued)

*Primary Examiner* — Kenneth T Lam
(74) *Attorney, Agent, or Firm* — Birch, Stewart, Kolasch & Birch, LLP

(57) ABSTRACT

A signal processing device, used to suppress cross-talk nonlinear distortion of a RF front end circuit. The first circuit generates a first PD signal and a second PD signal according to a first input signal and a second input signal. The first PD signal and the second PD signal are provided to a first PA and a second PA of the RF front end circuit. The second circuit generates a first control signal and a second control signal according to a first output signal, a second output signal, a first DPD signal and a second DPD signal, so as to control the first circuit to generate the first PD signal and the second PD signal. The first PA generates the first output signal through a first filter having a first operating BW. The second PA generates the second output signal through a second filter having a second operating BW.

16 Claims, 9 Drawing Sheets

(58) Field of Classification Search
CPC ... H04B 2001/0408; H04L 25/49; H03F 1/32; H03F 3/195; H03F 3/213; H03F 2200/451
See application file for complete search history.

(56) References Cited

U.S. PATENT DOCUMENTS

| | | | | |
|---|---|---|---|---|
| 2021/0409079 A1* | 12/2021 | Ghannouchi | ........ | H04B 1/0475 |
| 2022/0166389 A1* | 5/2022 | Hamid | .......... | H03F 3/245 |
| 2022/0407556 A1* | 12/2022 | Braun | ............ | H04B 1/0053 |
| 2023/0253995 A1* | 8/2023 | Wang | ............ | H04B 1/0475 |
| | | | | 455/552.1 |
| 2023/0275605 A1* | 8/2023 | Zhang | ........... | H04B 7/0417 |
| | | | | 375/297 |

OTHER PUBLICATIONS

Amin et al., "Behavioral Modeling and Linearization of Crosstalk and Memory Effects in RF MIMO Transmitters", IEEE Transactions On Microwave Theory and Techniques, vol. 62, No. 4, Apr. 2014, pp. 810-823.

Bassam et al., "Crossover Digital Predistorter for the Compensation of Crosstalk and Nonlinearity in MIMO Transmitters", IEEE Transactions On Microwave Theory and Techniques, vol. 57, No. 5, May 2009, pp. 1119-1128.

Ding et al., "A Robust Digital Baseband Predistorter Constructed Using Memory Polynomials", IEEE Transactions On Communications, vol. 52, No. 1, Jan. 2004, pp. 159-165.

Gregorio et al., "Power amplifier linearization technique with IQ imbalance and crosstalk compensation for broadband MIMO-OFDM transmitters", EURASIP Journal on Advances in Signal Processing, No. 19, 2011, pp. 1-15.

Hausmair et al., "Digital Predistortion for Multi-Antenna Transmitters Affected by Antenna Crosstalk", IEEE Transactions On Microwave Theory and Techniques, vol. 66, No. 3, Mar. 2018, pp. 1524-1535.

Yao et al., "A Digital Predistortion Scheme Exploiting Degrees-of-Freedom for Massive MIMO Systems", 2018 IEEE International Conference on Communications (ICC), 2018, 5 pages.

Yu et al., "Band-Limited Volterra Series-Based Digital Predistortion for Wideband RF Power Amplifiers", IEEE Transactions On Microwave Theory and Techniques, vol. 60, No. 12, Dec. 2012, pp. 4198-4208.

Zhao et al., "A Novel Multi-Band Reduced Sampling Rate and I/Q Compensation Technique for RF Power Amplifiers", IEEE Access, vol. 7, 2019, pp. 179701-179711.

* cited by examiner

SIGNAL PROCESSING DEVICE

This application claims the benefit of Taiwan application Serial No. 111138438, filed Oct. 11, 2022, the subject matter of which is incorporated herein by reference.

TECHNICAL FIELD

The present disclosure relates to an electronic device, and more particularly, relates to a signal processing device for suppressing crosstalk nonlinear distortion.

BACKGROUND

With the evolution of communication technology, the wireless communication system often employs a multi-input and multi-output (MIMO) multi-antenna architecture, and the radio frequency (RF) front-end circuit of the MIMO system has multiple RF components, such as the power amplifier (PA). When a plurality of RF components are densely disposed on a chip with a small area, a crosstalk effect will occur between the RF components. This crosstalk effect will then complicate the nonlinear distortion of the PAs, which is referred to as "crosstalk nonlinear distortion".

In addition, in a MIMO system, the signals of each transmission path have different center frequencies, signal bandwidths (BW) or sampling frequencies. The above-mentioned crosstalk nonlinear distortion effect will greatly increase the BW of the coupled signal, which may increase the overall BW of the MIMO system by several times. In response to the increased bandwidth, the complexity of circuit design and the computation amounts of the system will be greatly increased, and circuitry components with higher hardware specifications must be provided. For example, high-speed (i.e., high sampling frequency) analog-to-digital (A-D) converters and digital-to-analog (D-A) converters must be provided.

Therefore, those skilled in the art are devoted to improve the signal processing of the MIMO system, so as to reduce the crosstalk nonlinear distortion of the RF components in the RF front end circuit.

SUMMARY

According to an aspect of the present disclosure, a signal processing device is provided for suppressing a crosstalk nonlinear distortion of a radio frequency (RF) front end circuit. The RF front end circuit comprises a first power amplifier (PA), a second PA, a first filter and a second filter. The signal processing device comprises a first circuit and a second circuit. The first circuit is configured to receive a first input signal through a first input transmission path, receive a second input signal through a second input transmission path, generate a first pre-distortion (PD) signal and a second PD signal according to the first input signal and the second input signal, transmit the first PD signal to the first PA through the first input transmission path, and transmit the second PD signal to the second PA through the second input transmission path, wherein the first input signal has a first input bandwidth (BW), and the second input signal has a second input BW. The second circuit is configured to receive a first output signal through a first output feedback path, receive a second output signal through a second output feedback path, receive a first digital-pre-distortion (DPD) signal through a first feedback path, receive a second DPD signal through a second feedback path, generate a first control signal and a second control signal according to the first output signal, the second output signal, the first DPD signal and the second DPD signal, and control the first circuit to generate the first PD signal and the second PD signal according to the first control signal and the second control signal. The first PA generates the first output signal through the first filter, the first filter has a first operating BW corresponding to the first input BW, and the second PA generates the second output signal through the second filter, the second filter has a second operating BW corresponding to the second input BW.

Figure 1A:
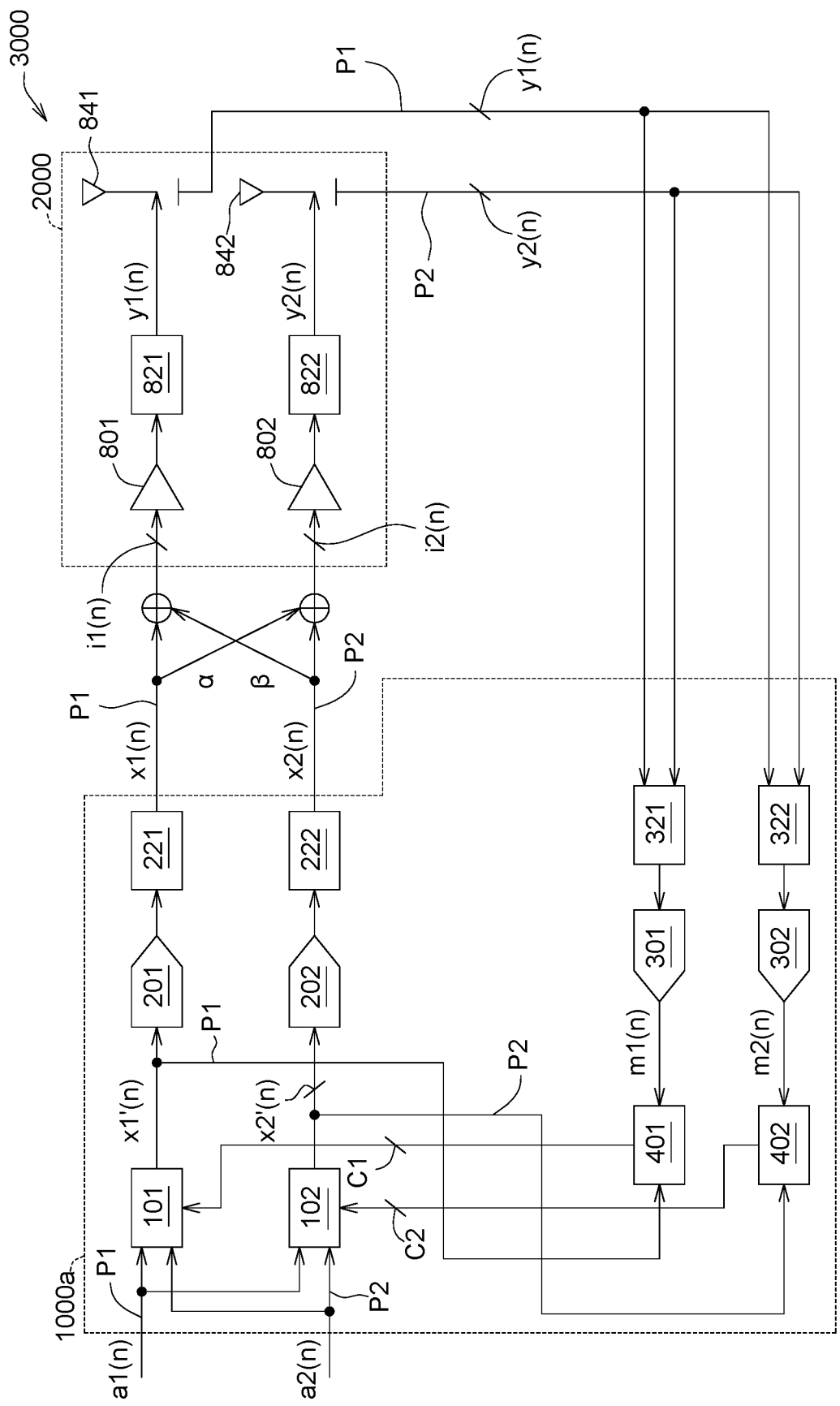
FIG. 1A is a schematic diagram of a signal processing device according to an embodiment of the disclosure, which is applied to a communication system.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

FIG. 1A is a schematic diagram of a signal processing device 1000a according to an embodiment of the disclosure, which is applied to a communication system 3000. As shown in FIG. 1A, the communication system 3000 includes an RF front end circuit 2000. The signal processing device 1000a is coupled to the RF front end circuit 2000, and the signal processing device 1000a is used to process nonlinear distortion of the RF front end circuit 2000. The communication system 3000 is a multi-input and multi-output (MIMO) system. For example, the communication system 3000 has two inputs and two outputs. The signals of the communication system 3000 are respectively transmitted on the first path P1 and the second path P2. The signal transmitted on the first path P1 may be coupled to the second path P2, and similarly, the signal transmitted on the second path P2 may be coupled to the first path P1. Therefore, nonlinear distortion of the RF front end circuit 2000 will be complicated, which is referred to as "crosstalk nonlinear distortion".

The RF front end circuit 2000 includes a first power amplifier (PA) 801, a second PA 802, a first filter 821, a second filter 822, a first antenna 841 and a second antenna 842. The first PA 801, the first filter 821 and the first antenna 841 are disposed on the first path P1, and the second PA 802, the second filter 822 and the second antenna 842 are disposed on the second path P2. On the first path P1 of the RF front end circuit 2000, the first PA 801 generates the first output signal y1(n) through the first filter 821, and the nonlinear distortion caused by the first PA 801 occurs in an output signal y1(n). n). On the second path P2 of the RF front end circuit 2000, the second PA 802 generates the second output signal y2(n) through the second filter 822, and the nonlinear distortion caused by the second PA 802 occurs in the second output signal y2(n). Since the signals transmitted by the first path P1 and the second path P2 are coupled to each other, the nonlinear distortion of the first output signal y1(n) and the second output signal y2(n) will be complicated and leads to a crosstalk nonlinear distortion.

The signal processing device 1000a performs a pre-distortion (PD) process to generate a first PD signal x1(n) and a second PD signal x2(n), thereby reducing or suppressing the crosstalk nonlinear distortion of the first output signal y1(n) and the second output signal y2(n). The first PD signal x1(n) is transmitted to the first PA 801 through the first path P1, and the second PD signal x2(n) is transmitted to the second PA 802 through the second path P2. More specifically, the signal processing device 1000a of the present embodiment receives the first input signal a1(n) and the second input signal a2(n) generated by the pre-stage circuit (not shown in FIG. 1A) of the communication system 3000, and the signal processing device 1000a also receives the first output signal y1(n) and the second output signal y2(n) generated by the RF front end circuit 2000. The signal processing device 1000a performs pre-distortion processing (PD processing) according to the above-mentioned signals to generate a first PD signal x1(n) and a second PD signal x2(n). In addition, the first PD signal x1(n) and the second PD signal x2(n) are fed back and inputted to the signal processing device 1000a.

The first input signal a1(n), the first PD signal x1(n) and the first output signal y1(n) are transmitted on the first path P1, the second input signal a2(n), the second PD signal x2(n) and the second output signal y2(n) are transmitted on the second path P2. Moreover, the first PD signal x1(n) and the second PD signal x2(n) are coupled to each other. For example, the first PD signal x1(n) is coupled to the second PD signal x2(n) in the second path P2, and the first PD signal x1(n) has a first coupling gain α. That is, the first PD signal x1(n) is attenuated by the first coupling gain α and then coupled to the second PD signal x2(n) to form the input signal i2(n) of the second PA 802, as shown in equation (1):

$$i2(n)=x2(n)+\alpha^*x1(n) \qquad \text{equation (1)}$$

Similarly, the second PD signal x2(n) is coupled to the first PD signal x1(n) on the first path P1, and the second PD signal x2(n) has a second coupling gain ß. That is, the second PD signal x2(n) is attenuated by the second coupling gain ß and then coupled to the first PD signal x1(n) to form the input signal i1(n) of the first PA 801, as shown in equation (2):

$$i1(n)=x1(n)+\beta^*x2(n) \qquad \text{equation (2)}$$

The first coupling gain α may be equal to or different from the second coupling gain ß. In this embodiment, the first coupling gain α is equal to the second coupling gain ß, and both the first coupling gain α and the second coupling gain ß are in the range of −12 dB to −20 dB.

The main components of the signal processing device 1000a are: a first PD circuit 101, a second PD circuit 102, a first computing circuit 401 and a second computing circuit 402. The first PD circuit 101 and the first computing circuit 401 are disposed on the first path P1, and the second PD circuit 102 and the second computing circuit 402 are disposed on the second path P2.

On the first path P1, the components related to the first PD circuit 101 are: the digital-to-analog (D-A) converter 201 and the modulation and up-conversion (MUC) circuit 221. The first PD circuit 101, the D-A converter 201 and the MUC circuit 221 are connected in series. The first PD circuit 101 performs digital pre-distortion (DPD) processing according to the first input signal a1(n) transmitted by the first path P1 and the second input signal a2(n) transmitted by the second path P2, so as to generate a first DPD signal x1'(n). That is, the first PD circuit 101 performs pre-distortion processing according to signals of multiple paths, which may be referred to as "coupling digital pre-distortion (CP-DPD)". The first PD circuit 101 is, for example, an adaptive filter, and adjusts filter-coefficients of the first PD circuit 101 according to the first control signal C1. Then, the D-A converter 201 performs conversion from the digital domain to the analog domain, and the MUC circuit 221 performs modulation and up-conversion to convert the first DPD signal x1'(n) into a first PD signal x1(n).

On the other hand, on the first path P1, the components related to the first computing circuit 401 are: the analog-to-digital (A-D) converter 301 and the demodulation and down-conversion (DMDC) circuit 321. The A-D converter 301 performs the conversion from the analog domain to the digital domain, and the DMDC circuit 321 performs DMDC operation to convert the first output signal y1(n) and the second output signal y2(n) into the first intermediate signal m1(n). The first computing circuit 401 generates a first control signal C1 according to the first intermediate signal m1(n) and the first DPD signal x1'(n), so as to adjust the filter-coefficients of the first PD circuit 101 accordingly. In one example, the first computing circuit 401 performs a least square (LS) operation to generate the first control signal C1.

Similarly, on the second path P2, the components related to the second PD circuit 102 are: the D-A converter 202 and the MUC circuit 222, which are connected to the second PD circuit 102 in series. The second PD circuit 102 performs "CP-DPD" processing according to the first input signal a1(n) transmitted by the first path P1 and the second input signal a2(n) transmitted by the second path P2, so as to generate a second DPD signal x2'(n). Then, the D-A converter 202 and the MUC circuit 222 convert the second DPD signal x2'(n) into an up-converted second PD signal x2(n) in analog domain.

On the other hand, on the second path P2, the components related to the second computing circuit 402 are: the A-D converter 302 and the DMDC circuit 322. The A-D converter 302 and the DMDC circuit 322 convert the first output signal y1(n) and the second output signal y2(n) into a second intermediate signal m2(n). The second computing circuit 402 performs operation (e.g., LS operation) according to the second intermediate signal m2(n) and the second DPD signal x2'(n), so as to generate a second control signal C2, and then to adjust filter-coefficients for the second PD circuit 102.

Figure 1B:
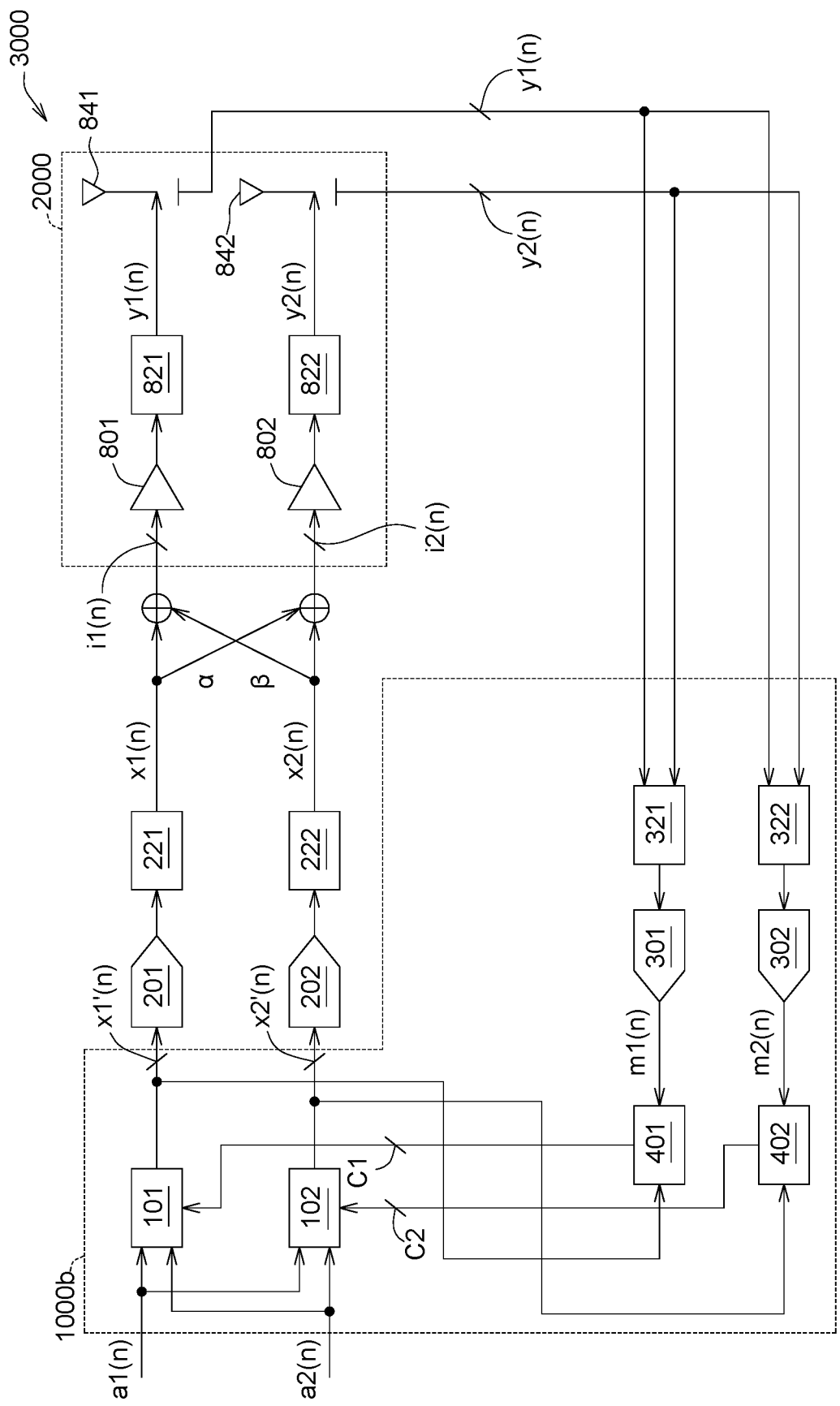
FIG. 1B is a schematic diagram of the signal processing device 1000b according to another embodiment of the disclosure, which is applied to the communication system.

FIG. 1B is a schematic diagram of the signal processing device 1000b according to another embodiment of the disclosure, which is applied to the communication system 3000. The signal processing device 1000b of this embodiment is similar to the signal processing device 1000a of FIG. 1A, the difference is that the signal processing device 1000b of this embodiment does not include the D-A converter 201, the MUC circuit 221, and the D-A converter 202 and the MUC circuit 222. That is, in the embodiment of FIG. 1B, the D-A converter 201, the MUC circuit 221, the D-A converter 202 and the MUC circuit 222 may be existing components of the communication system 3000.

The signal processing device 1000b of this embodiment directly outputs the first DPD signal x1'(n) and the second DPD signal x2'(n). Then, the first DPD signal x1'(n) and the second DPD signal x2'(n) are performed by D-A conversion and up-conversion to form the first PD signal x1(n) and the second PD signal x2(n), which are then provided to the RF front end circuit 2000.

Figure 1C:
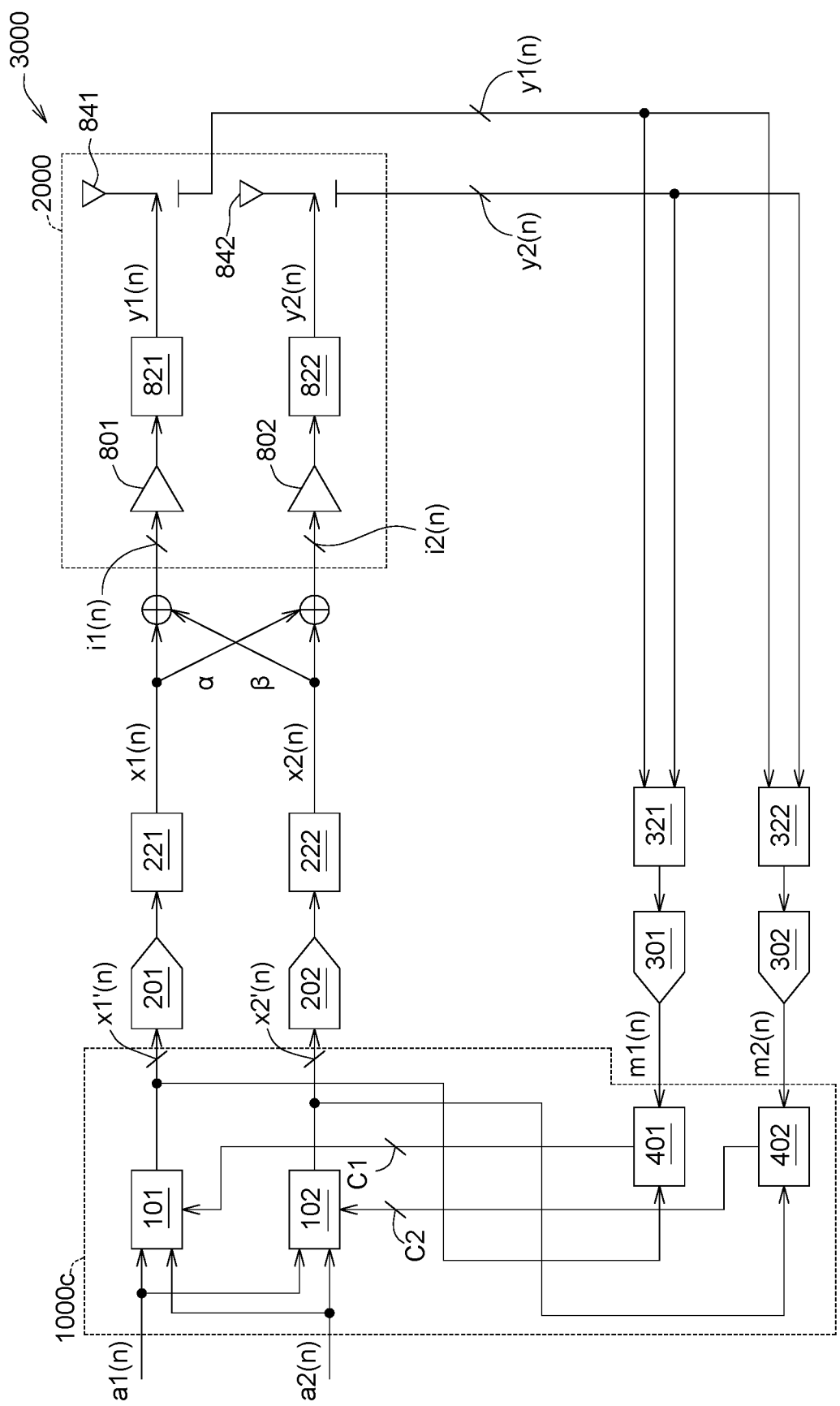
FIG. 1C is a schematic diagram of the signal processing device 1000c according to still another embodiment of the disclosure, which is applied to the communication system.

FIG. 1C is a schematic diagram of the signal processing device 1000c according to still another embodiment of the disclosure, which is applied to the communication system 3000. The signal processing device 1000c of this embodiment is similar to the signal processing device 1000b of FIG. 1B, except that, the signal processing device 1000c of this embodiment does not include the A-D converter 301, the DMDC circuit 321, and the A-D converter 302 and the DMDC circuit 322. That is, in the embodiment of FIG. 1C, the A-D converter 301, the DMDC circuit 321, and the A-D converter 302 and the DMDC circuit 322 may be existing components of the communication system 3000. The first intermediate signal m1(n) and the second intermediate signal m2(n) are generated by the communication system 3000. The signal processing device 1000c receives the first intermediate signal m1(n) and the second intermediate signal m2(n) from the communication system 3000, and receives the first input signal a1(n) and the second input signal a2(n) from the pre-stage circuit, and then performs "CP-DPD" processing according to the above-mentioned signals to generate the first DPD signal x1'(n) and the second DPD signal x2'(n).

Figure 2A:
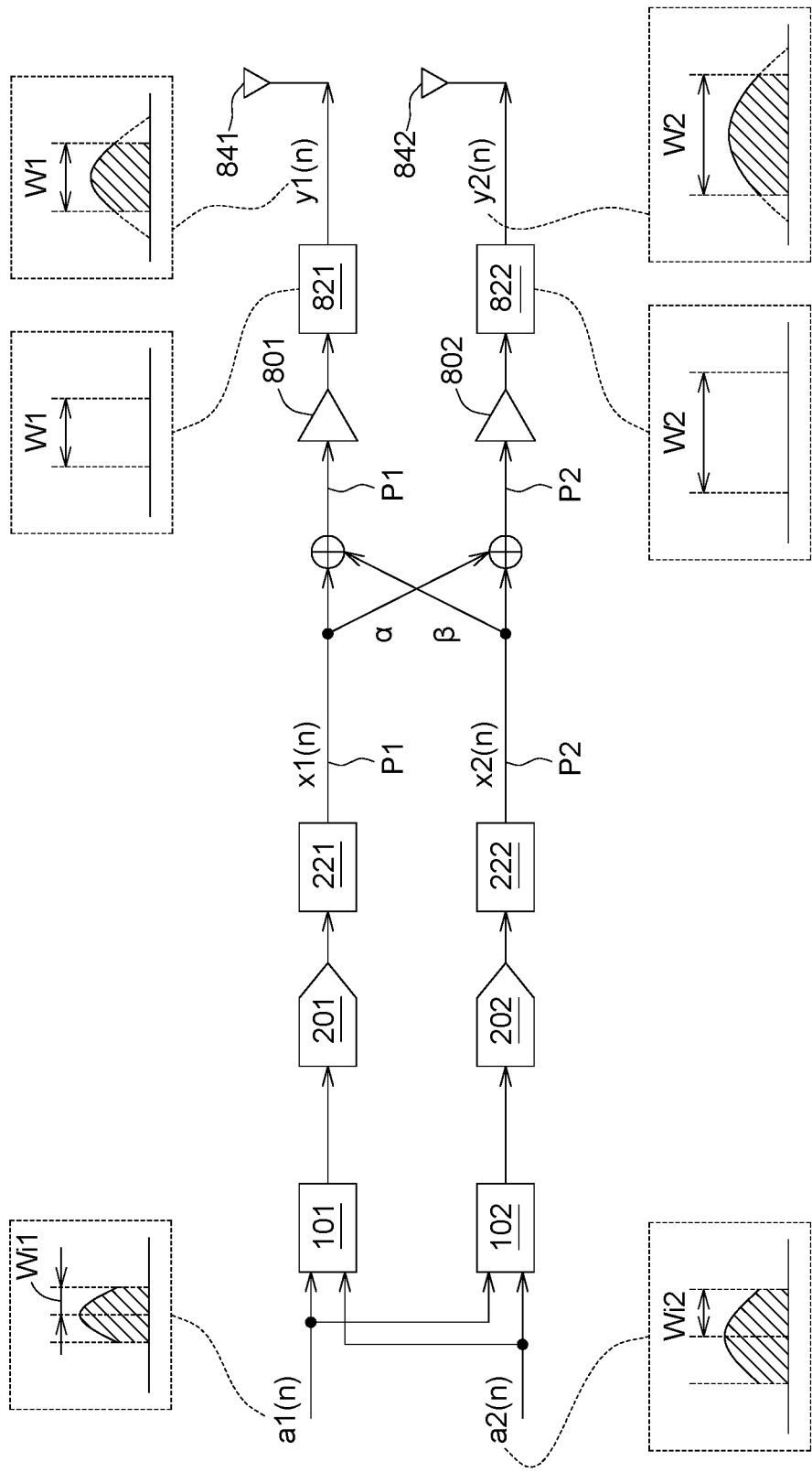
FIGS. 2A and 2B are schematic diagrams showing operation of the signal processing device of FIG. 1A.
Figure 2B:
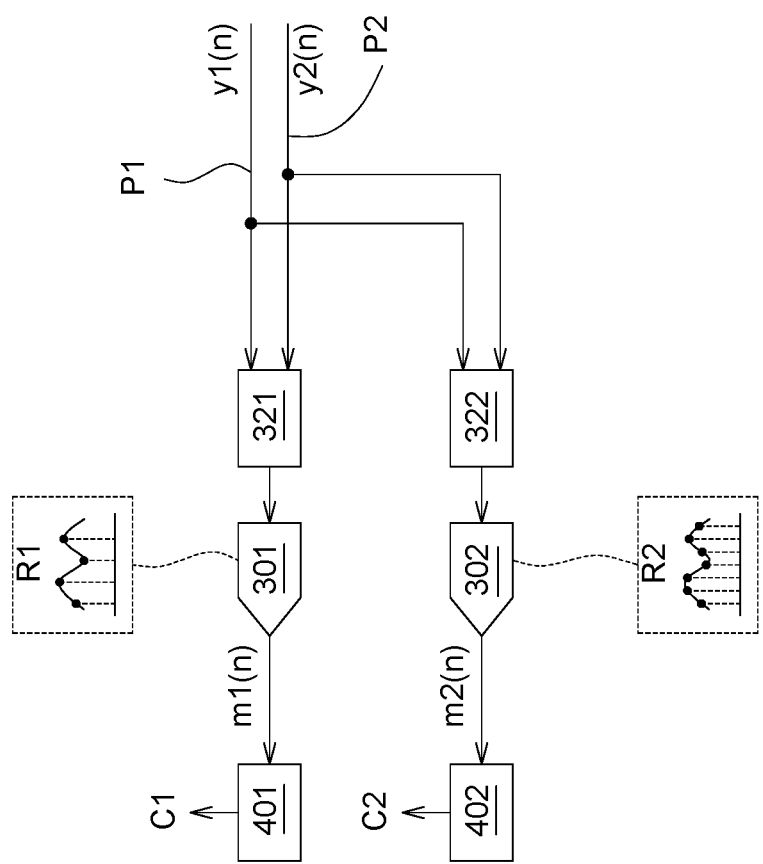

FIGS. 2A and 2B are schematic diagrams showing operation of the signal processing device 1000a of FIG. 1A. Referring first to FIG. 2A, the first input signal a1(n) received through the first path P1 is a baseband signal, and the first input signal a1(n) has a first input bandwidth Wi1. Moreover, the second input signal a2(n) received through the second path P2 is also a baseband signal, and the second input signal a2(n) has a second input bandwidth Wi2. The first input bandwidth Wi1 may be equal to or different from the second input bandwidth Wi2. In this embodiment, the first input bandwidth Wi1 is different from the second input bandwidth Wi2, the first input bandwidth Wi1 is, for example, 500 MHz, and the second input bandwidth Wi2 is, for example, 1 GHz. That is, the second input bandwidth Wi2 is substantially twice the first input bandwidth Wi1.

The first filter 821 and the second filter 822 are band pass filters (BPF), the first filter 821 has a first operating bandwidth W1, and the second filter 822 has a second operating bandwidth W2. Through the effect of "band limiting" of the first filter 821, the signal bandwidth of the first output signal y1(n) is limited within the first operating bandwidth W1. Similarly, the second filter 822 limits the signal bandwidth of the second output signal y2(n) within the second operating bandwidth W2. The first operating bandwidth W1 corresponds to the first input bandwidth Wi1, and the second operating bandwidth W2 corresponds to the second input bandwidth Wi2. In one example, the first operating bandwidth W1 is not equal to the second operating bandwidth W2, and the first operating bandwidth W1 is greater than or equal to twice the first input bandwidth Wi1 (e.g., the first operating bandwidth W1 is greater than or equal to 1 GHz), the second operating bandwidth W2 is greater than or equal to twice the second input bandwidth Wi2 (e.g., the second operating bandwidth W1 is greater than or equal to 2 GHz). In another example, the first operating bandwidth W1 is equal to the second operating bandwidth W2, and both the first operating bandwidth W1 and the second operating bandwidth W2 are greater than or equal to twice of the largest one of the first input bandwidth Wi1 and the second input bandwidth Wi2 (e.g., both the first operating bandwidth W1 and the second operating bandwidth W2 are greater than or equal to 2 GHz). Corresponding to the index "n" of a time-series, the equivalent impulse response of the first filter 821 in baseband is w1(n), and the equivalent impulse response of the second filter 822 in baseband is w2(n).

On the first transmission path P1, the first PA 801 and the first filter 821 generate the first output signal y1(n) according to the first PD signal x1(n). Based on the crosstalk nonlinear distortion of the first PA 801 and the second PA 802 and the "band limiting" effect of the first filter 821, the first output signal y1(n) can be expressed as a relationship between the first PD signal x1(n), the second PD signal x2(n) and the impulse response w1(n) of the first filter 821, which is shown as equation (3):

$$y1(n) = \left\{\sum_{p=1}^{P}\sum_{q=1}^{P-p+1}\sum_{m1=0}^{M1}\sum_{m2=0}^{M2} hp, q, (m1, m2), 1 \times x1 \right.$$ equation (3)

$$(n-m1) \times |x1(n-m1-m2)|^{2(p-1)} \times |x2(n-m1-m2)|^{2(q-1)}\right\} *$$

$$w1(n) + \left\{\sum_{p=1}^{P}\sum_{q=1}^{P-p+1}\sum_{m1=0}^{M1}\sum_{m2=0}^{M2} hp, q,\right.$$

$$(m1, m2), 2 \times x2(n-m1) \times |x2(n-m1-m2)|^{2(p-1)} \times$$

$$\left.|x1(n-m1-m2)|^{2(q-1)}\right\} * w1(n)$$

In equation (3), the first output signal y1(n) is represented by a memory polynomial (MP). Wherein, "hp,q,(m1,m2),1" are coefficients related to the first PA 801, and "hp,q,(m1, m2),2" are coefficients related to the second PA 802. "p" and "q" are the orders of the memory polynomial. "M1" and "M2" are the memory depths of the memory polynomial. When the values of the first coupling gain and the second coupling gain ß are smaller, the terms of higher order can be ignored. For example, when the first coupling gain and the second coupling gain ß are both less than −12 dB (corresponding to a decimal value of 0.25), terms above fourth order may be ignored. The first output signal y1(n) of equation (3) may be simplified as equation (4):

$$y1(n) \cong \sum_{p=1}^{P}\sum_{m=0}^{M}$$ equation (4)

$$\left\{hp, m, 1\sum_{k=0}^{K} x1(n-m-k) \times |x1(n-m-k)|^{p} * w1(n) + hp,\right.$$

$$m, 2\sum_{k=0}^{K} x2(n-m-k) \times |x1(n-m-k)|^{p} * w1(n) + hp, m,$$

$$\left.3\sum_{k=0}^{K} x2^{*}(n-m-k) \times x1^{2}(n-m-k) \times |x1(n-m)|^{p/2} * w1(n)\right\}$$

Similarly, on the second transmission path P2, the second PA 802 and the second filter 822 generate the second output signal y2(n) according to the second PD signal x2(n). Based on the crosstalk nonlinear distortion of the first PA 801 and the second PA 802 and the "band limiting" of the second filter 822, the second output signal y2(n) can be expressed as a relationship between the first PD signal x1(n), the second PD signal x2(n) and the impulse response w2(n) of the second filter 822, which is simplified as equation (5):

$$y2(n) \cong \sum_{p=1}^{P} \sum_{m=0}^{M}$$ equation (5)

$\{hp, m, 1 \sum_{k=0}^{K} x2(n-m-k) \times |x2(n-m-k)|^p * w2(n) + hp,$ $m, 2 \sum_{k=0}^{K} x1(n-m-k) \times |x2(n-m-k)|^p * w2(n) + hp, m,$ $3 \sum_{k=0}^{K} x1^*(n-m-k) \times x2^2(n-m-k) \times |x2(n-m)|^{p/2} * w2(n)\}$ Next, referring to FIG. 2B, the A-D converter 301 has a first sampling frequency R1, and the A-D converter 302 has a second sampling frequency R2. The first sampling frequency R1 corresponds to the first input bandwidth Wi1, e.g., the first sampling frequency R1 is greater than or equal to twice the first input bandwidth Wi1 (i.e., the first sampling frequency R1 is greater than or equal to 1 GHz). The second sampling frequency R2 corresponds to the second input bandwidth Wi2, and the second sampling frequency R2 is greater than or equal to twice the second input bandwidth Wi2 (i.e., the second sampling frequency R2 is greater than or equal to 2 GHz).

In another example, the A-D converter 301 and the A-D converter 302 have the same hardware specifications, and the first sampling frequency R1 of the A-D converter 301 is equal to the second sampling frequency R2 of the A-D converter 302. In this example, both the first sampling frequency R1 and the second sampling frequency R2 are greater than or equal to twice the largest one of the first input bandwidth Wi1 and the second input bandwidth Wi2.

Figure 3A:
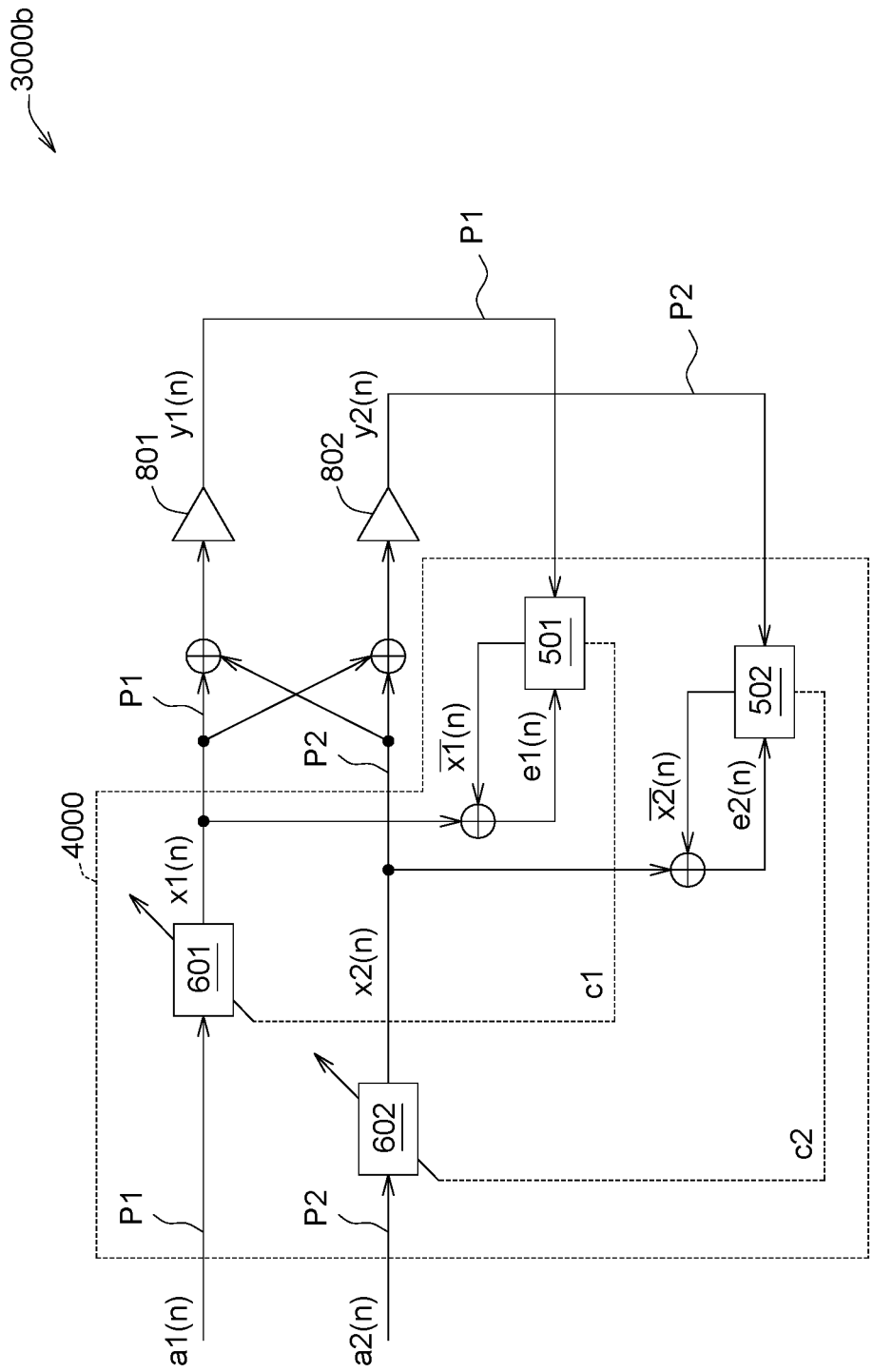
FIG. 3A is a schematic diagram of a signal processing device of a comparative example applied to a communication system.

Next, please refer to FIG. 3A, which is a schematic diagram of a signal processing device 4000 of a comparative example applied to a communication system 3000b. The communication system 3000b is a single-input and single-output (SISO) communication system. The first computing circuit 501 and the second computing circuit 502 of the signal processing device 4000 respectively execute a single-input and single-output indirect learning algorithm (SISO ILA). The first computing circuit 501 performs "SISO ILA" according to the first output signal y1(n) and the first PD signal x1(n) transmitted by the first path P1, so as to generate the first control signal C1. The first control signal C1 is used to adjust the filter-coefficients of the first PD circuit 601. In the comparative example of FIG. 3A, the first PD circuit 601 performs PD processing according to the first input signal a1(n) of the first path P1, so as to generate the first PD signal x1(n). That is, the first PD circuit 601 performs general DPD processing according to the signal of a single path, rather than performing "CP-DPD".

Similarly, the second computing circuit 502 of the signal processing device 4000 performs "SISO ILA" according to the second output signal y2(n) and the second PD signal x2(n) transmitted by the second path P2 to generate the second The control signal C2, and adjust the filter coefficient of the second PD circuit 602 according to the second control signal C2. The second PD circuit 602 performs general PD processing according to the second input signal a2(n) of the second path P2 to generate the second PD signal x2(n).

In the comparative example of FIG. 3A, the first PA 801 and the second PA 802 directly output the first output signal y1(n) and the second output signal y2(n). Furthermore, the first output signal y1(n) and the second output signal y2(n) are not processed by the bandpass filter. Therefore, the signal bandwidths of the first output signal y1(n) and the second output signal y2(n) are not limited, hence, sampling frequency related to the A-D converter (not shown in FIG. 3A) of the first computing circuit 501 must be three to five times of the first input bandwidth Wi1 of the first input signal a1(n). Similarly, the sampling frequency of the A-D converter (not shown in FIG. 3A) of the second computing circuit 502 must be three to five times the second input bandwidth Wi2 of the second input signal a2(n).

In contrast, in the embodiment of FIG. 2B of the present disclosure, the first sampling frequency R1 of the A-D converter 301 may be twice the first input bandwidth Wi1, and the second sampling frequency R2 of the A-D converter 302 may be twice the second input bandwidth Wi2. The first sampling frequency R1 and the second sampling frequency R2 of the present disclosure are lower than the sampling frequency of the A-D converter of the comparative example in FIG. 3A, hence, the A-D converters 301 and 302 of the present disclosure may employ lower hardware specification and have lower cost.

In addition, in the signal processing device 4000 of the comparative example in FIG. 3A, the first computing circuit 501, the first PD circuit 601, the second computing circuit 502, and the second PD circuit 602 are all processed based on signals of a single path. Therefore, suppressing of crosstalk nonlinear distortion of the first PA 801 and the second PA 802 performed by the signal processing device 4000 is much weak.

In contrast, in each of the embodiments of FIGS. 1A-1C of the present disclosure, the first computing circuit 401, the first PD circuit 101, the second computing circuit 402 and the second PD circuit 102 are processed based on signals of multiple paths. For example, the first computing circuit 401 performs multi-input and multi-output indirect learning algorithm (MIMO ILA) according to the first output signal y1(n) of the first path P1 and the first DPD signal x1'(n) and the second output signal y2(n) of the second path P2. The first PD circuit 101 performs "CP-DPD" according to the first input signal a1(n) of the first path P1 and the first control signal C1 and the second input signal a2(n) of the second path P2. Therefore, the signal processing devices 1000a, 1000b and 1000c of the present disclosure are better than the signal processing device 4000 of FIG. 3A in suppressing the crosstalk nonlinear distortion of the first PA 801 and the second PA 802.

Figure 3B:
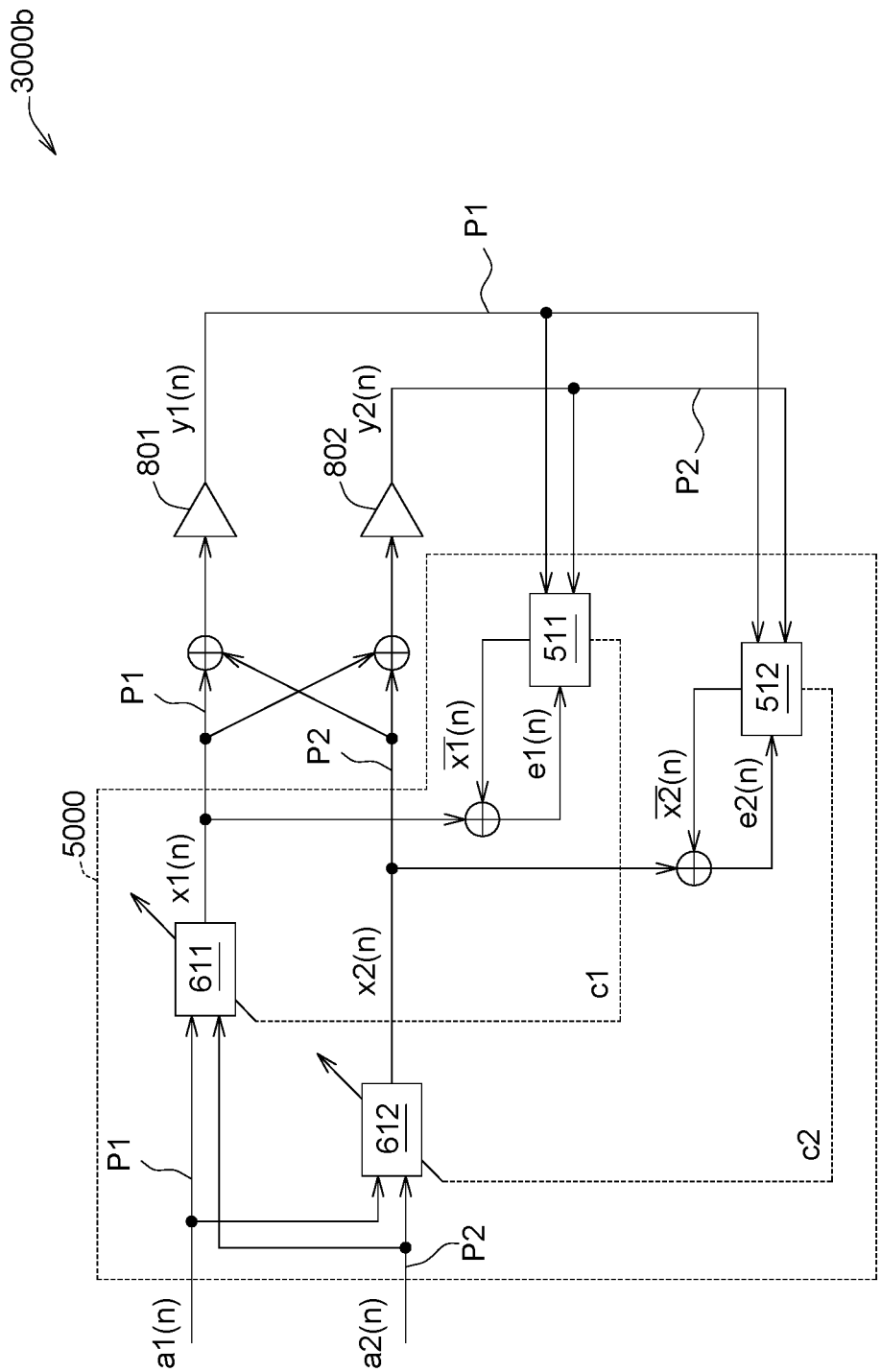
FIG. 3B is a schematic diagram of the signal processing device of another comparative example applied to the communication system.

Next, please refer to FIG. 3B, which shows a schematic diagram of the signal processing device 5000 of another comparative example applied to the communication system 3000b. The communication system 3000b shown in FIG. 3B is a MIMO communication system. The first computing circuit 511 and the second computing circuit 512 of the signal processing device 5000 both perform "MIMO ILA" according to signals of multiple paths. For example, the first computing circuit 511 performs processing according to the first output signal y1(n) of the first path P1 and the second output signal y2(n) of the second path P2. In addition, the first PD circuit 611 and the second PD circuit 612 both perform "CP-DPD" according to the signals of the multiple paths. For example, the first PD circuit 611 performs processing according to the first input signal a1(n) of the first path P1 and the second input signal a2(n) of the second path P2.

Even though the first computing circuit 511, the second computing circuit 512, the first PD circuit 611, and the second PD circuit 612 of the comparative example in FIG. 3B deal with the crosstalk effect according to the signals of multiple paths, however, the first output signal y1(n) and the second output signal y2(n) of the comparative example in FIG. 3B are not processed by the band-pass filter, and the signal bandwidth thereof is not limited. Therefore, the signal processing device 5000 shown in FIG. 3B is weaker in suppressing the crosstalk nonlinear distortion of the first PA 801 and the second PA 802 than the signal processing devices 1000a, 1000b and 1000c of the present disclosure.

Figure 4A:
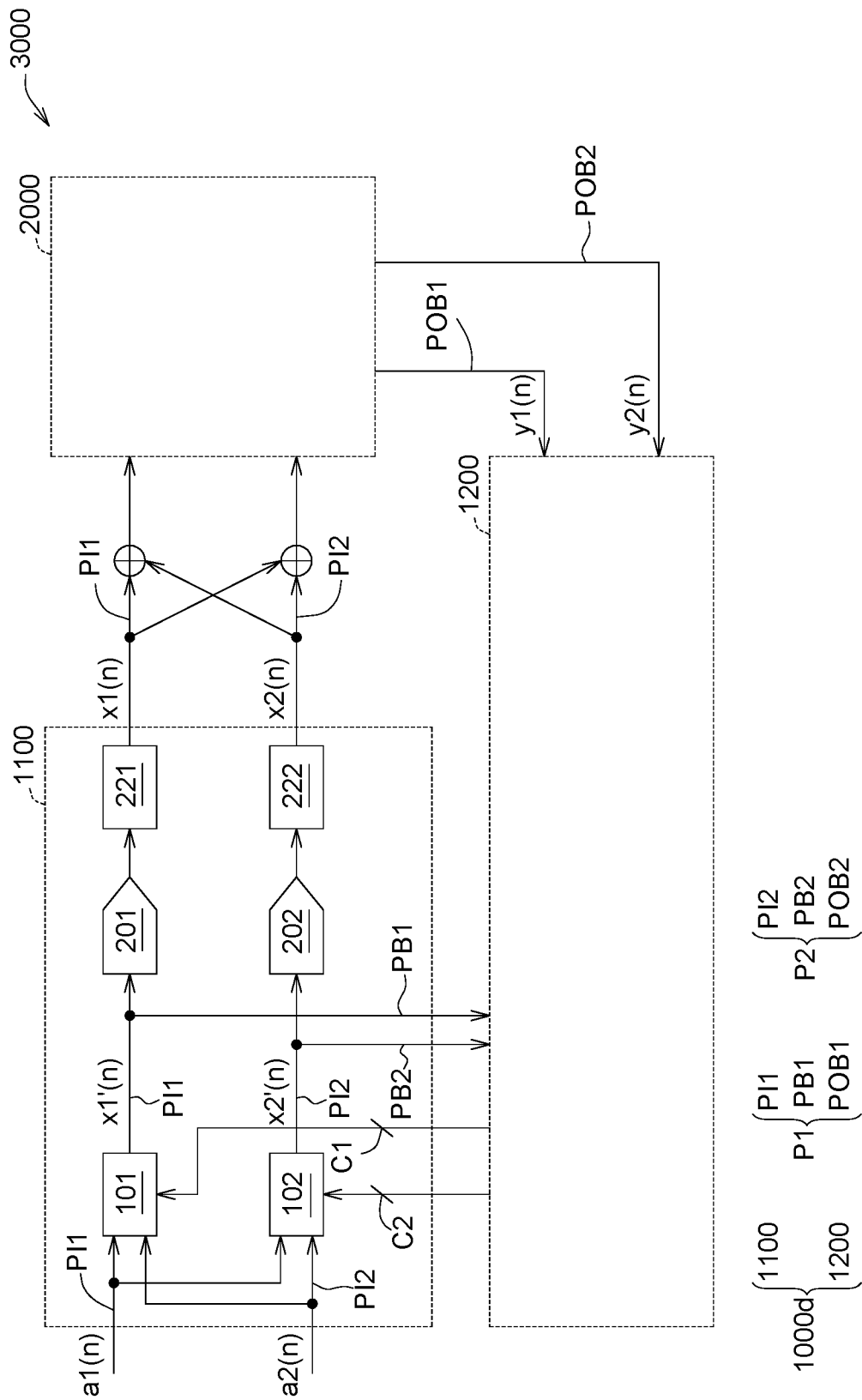
FIG. 4A is a schematic diagram of a signal processing device according to yet another embodiment of the disclosure, which is applied to a communication system.

FIG. 4A is a schematic diagram of a signal processing device 1000d according to yet another embodiment of the disclosure, which is applied to a communication system 3000. The signal processing device 1000d of this embodiment is similar to the signal processing device 1000a of FIG. 1A, the difference is that, the signal processing device 1000d of this embodiment is divided into a first circuit 1100 and a second circuit 1200. In addition, the first path P1 of the communication system 3000 is divided into a first input transmission path P11, a first feedback path PB1, and a first output feedback path POB1. Similarly, the second path P2 of the communication system 3000 is divided into a second input transmission path PI2, a second feedback path PB2 and a second output feedback path POB2.

The first circuit 1100 receives the first input signal $a1(n)$ through the first input transmission path P11, receives the second input signal $a2(n)$ through the second input transmission path PI2, and receives the control signal C1 and the second control signal C2 from the second circuit 1200. The first circuit 1100 generates a first PD signal $x1(n)$ and a second PD signal $x2(n)$ according to the first input signal $a1(n)$ and the second input signal $a2(n)$. Furthermore, the first PD signal $x1(n)$ is transmitted to the first PA 801 through the first input transmission path P11, and the second PD signal $x2(n)$ is transmitted to the second PA 802 through the second input transmission path PI2. The first input signal $a1(n)$ has a first input bandwidth Wi1, and the second input signal $a2(n)$ has a second input bandwidth Wi2.

The first PA 801 generates the first output signal $y1(n)$ through the first filter 821, and the first filter 821 has a first operating bandwidth W1. Through the band-limiting effect of the first filter 821, the signal bandwidth of the first output signal $y1(n)$ is limited within the first operating bandwidth W1. The first operating bandwidth W1 corresponds to the first input bandwidth Wi1, for example, the first operating bandwidth W1 is greater than or equal to twice the first input bandwidth Wi1. Similarly, the second PA 802 generates the second output signal $y2(n)$ through the second filter 822, and the second filter 822 has a second operating bandwidth W2. Through the band-pass filtering of the second filter 822, the signal bandwidth of the second output signal $y2(n)$ is limited within the second operating bandwidth W2. The second operating bandwidth W2 corresponds to the second input bandwidth Wi2, for example, the second operating bandwidth W2 is greater than or equal to twice the second input bandwidth Wi2. Furthermore, the RF front end circuit 2000 transmits the first output signal $y1(n)$ to the second circuit 1200 through the first output feedback path POB1, and transmits the second output signal $y2(n)$ to the second circuit 1200 through the second output feedback path POB2.

In the first circuit 1100, the first PD circuit 101, the D-A converter 201 and the MUC circuit 221 are disposed on the first input transmission path P11. The first PD circuit 101 receives the first input signal $a1(n)$ through the first input transmission path P11, receives the second input signal $a2(n)$ through the second input transmission path PI2, and performs "CP-DPD" to generate the first DPD signal $x1'(n)$ based on the first input signal $a1(n)$, the second input signal $a2(n)$ and the first control signal C1, which is similar to "CP DPD" processing executed by the first PD circuit 611 of the comparative example in FIG. 3B. The D-A converter 201 and the MUC circuit 221 convert the first DPD signal $x1'(n)$ into a first PD signal $x1(n)$.

Similarly, the second PD circuit 102, the D-A converter 202 and the MUC circuit 222 are disposed on the second input transmission path PI2. The second PD circuit 102 receives the first input signal $a1(n)$ through the first input transmission path P11, receives the second input signal $a2(n)$ through the second input transmission path PI2, and performs "CP-DPD" to generate the second DPD signal $x2'(n)$ based on the first input signal $a1(n)$, the second input signal $a2(n)$ and the second control signal C2, which is similar to "CP DPD" processing executed by the second PD circuit 612 of the comparative example in FIG. 3B. The D-A converter 202 and the MUC circuit 222 convert the second DPD signal $x2'(n)$ into the second PD signal $x2(n)$.

The first feedback path PB1 is connected to the first input transmission path P11. The first circuit 1100 transmits the first DPD signal $x1'(n)$ to the second circuit 1200 through the first feedback path PB1. The second feedback path PB2 is connected to the second input transmission path PI2. The first circuit 1100 transmits the second DPD signal $x2'(n)$ to the second circuit 1200 through the second feedback path PB2.

Figure 4B:
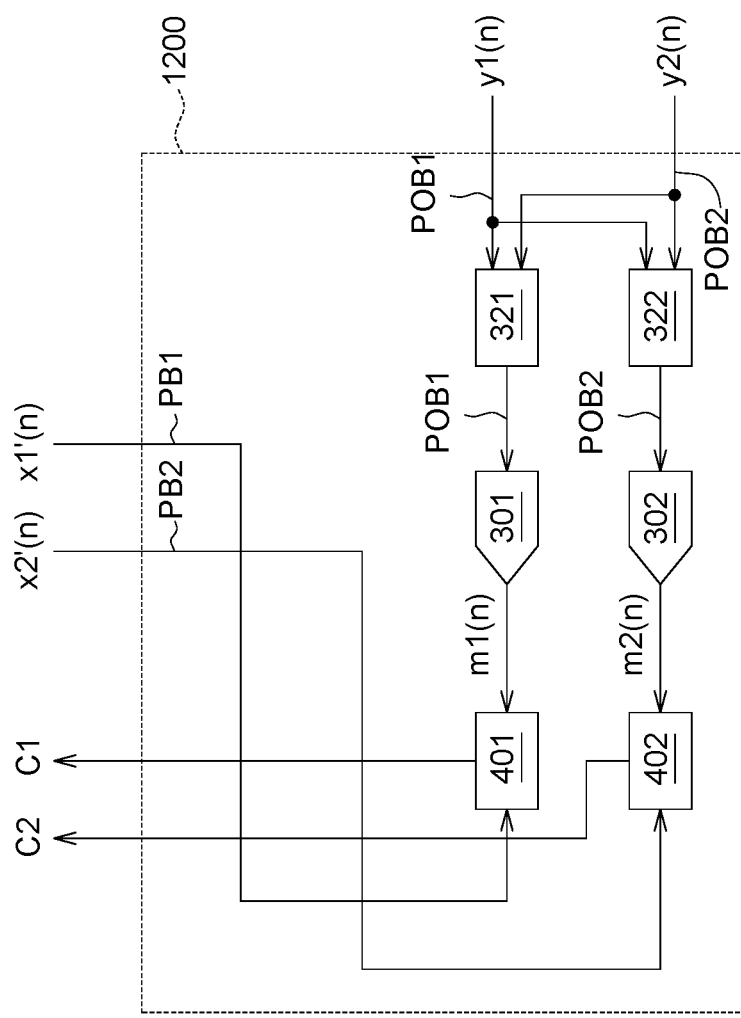
FIG. 4B is a block diagram of the second circuit of the signal processing device of FIG. 4A.

Next, referring to FIG. 4B, which is a block diagram of the second circuit 1200 of the signal processing device 1000d of FIG. 4A. The second circuit 1200 receives the first output signal $y1(n)$ through the first output feedback path POB1, receives the second output signal $y2(n)$ through the second output feedback path POB2, receives the first DPD signal $x1'(n)$ through the first feedback path PB1, and receives the second DPD signal $x2'(n)$ through the second feedback path PB2. The second circuit 1200 generates the first control signal C1 and the second control signal C2 according to the first output signal $y1(n)$, the second output signal $y2(n)$, the first DPD signal $x1'(n)$ and the second DPD signal $x2'(n)$. Furthermore, the second circuit 1200 controls the first circuit 1100 to generate the first PD signal $x1(n)$ and the second PD signal $x2(n)$ according to the first control signal C1 and the second control signal C2.

In the second circuit 1200, the first computing circuit 401, the A-D converter 301 and the DMDC circuit 321 are disposed in the first output feedback path POB1. The A-D converter 301 and the DMDC circuit 321 generate the first intermediate signal $m1(n)$ according to the first output signal $y1(n)$ and the second output signal $y2(n)$. The A-D converter 301 has a first sampling frequency R1 that is greater than or equal to twice the first input bandwidth Wi1.

The first computing circuit 401 generates the first control signal C1 according to the first intermediate signal $m1(n)$ and the first DPD signal $x1'(n)$. That is, the first computing circuit 401 performs "MIMO ILA" according to the signals received by multiple paths (i.e., the first output feedback path POB1, the second output feedback path POB2 and the first feedback path PB1) to generate the first control signal C1, which is similar to the "MIMO ILA" performed by the first computing circuit 511 of the comparative example in FIG. 3B. In an example, the first computing circuit 401 performs an LS operation to generate the first control signal C1, and adjusts the filter coefficient of the first PD circuit 101 according to the first control signal C1.

Similarly, in the second circuit 1200, the second computing circuit 402, the A-D converter 302, and the DMDC circuit 322 are disposed in the second output feedback path POB2. The A-D converter 302 and the DMDC circuit 322 generate the second intermediate signal $m2(n)$ according to the first output signal $y1(n)$ and the second output signal $y2(n)$. The A-D converter 302 has a second sampling frequency R2 that is greater than or equal to twice the second input bandwidth Wi2.

The second computing circuit 402 generates a second control signal C2 according to the second intermediate signal m2(n) and the second DPD signal x2'(n). That is, the second computing circuit 402 performs "MIMO ILA" according to the signals received by multiple paths (i.e., the first output feedback path POB1, the second output feedback path POB2 and the second feedback path PB2) to generate the second control signal C2, which is similar to the "MIMO ILA" performed by the second computing circuit 512 of the comparative example in FIG. 3B. In an example, the second computing circuit 402 performs a LS operation to generate the second control signal C2, and adjusts the filter coefficient of the second PD circuit 102 according to the second control signal C2.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A signal processing device, for suppressing a crosstalk nonlinear distortion of a radio frequency (RF) front end circuit, the RF front end circuit comprises a first power amplifier (PA), a second PA, a first filter and a second filter, the signal processing device comprising:
    a first circuit, configured to receive a first input signal through a first input transmission path, receive a second input signal through a second input transmission path, generate a first pre-distortion (PD) signal and a second PD signal according to the first input signal and the second input signal, transmit the first PD signal to the first PA through the first input transmission path, and transmit the second PD signal to the second PA through the second input transmission path, wherein the first input signal has a first input bandwidth (BW), and the second input signal has a second input BW; and
    a second circuit, configured to receive a first output signal through a first output feedback path, receive a second output signal through a second output feedback path, receive a first digital-pre-distortion (DPD) signal through a first feedback path, receive a second DPD signal through a second feedback path, generate a first control signal and a second control signal according to the first output signal, the second output signal, the first DPD signal and the second DPD signal, and control the first circuit to generate the first PD signal and the second PD signal according to the first control signal and the second control signal,
    wherein, the first PA generates the first output signal through the first filter, the first filter has a first operating BW corresponding to the first input BW, and the second PA generates the second output signal through the second filter, the second filter has a second operating BW corresponding to the second input BW.

2. The signal processing device according to claim 1, wherein the first input BW is not equal to the second input BW, the first operating BW is greater than or equal to twice of the first input BW, the second operating BW is greater than or equal to twice of the second input BW.

3. The signal processing device according to claim 1, wherein the first feedback path is connected to the first input transmission path, and the second feedback path is connected to the second input transmission path.

4. The signal processing device according to claim 1, wherein the first PD signal is coupled to the second PD signal on the second input transmission path, the first PD signal has a first coupling gain, and the second PD signal is coupled to the first PD signal on the first input transmission path, the second PD signal has a second coupling gain.

5. The signal processing device according to claim 1, wherein the first circuit comprising:
    a first PD circuit, configured to receive the first input signal through the first input transmission path, receive the second input signal through the second input transmission path, generate the first DPD signal according to the first input signal, the second input signal and the first control signal, and transmit the first DPD signal to the second circuit through the first feedback path; and
    a first digital-to-analog (D-A) converter and a first modulation and up-conversion (MUC) circuit, configured to convert the first DPD signal into the first PD signal,
    wherein, the first PD circuit, the first D-A converter and the first MUC circuit are disposed on the first input transmission path.

6. The signal processing device according to claim 5, wherein the first PD circuit performs a coupling DPD (CP-DPD) process according to the first input signal, the second input signal and the first control signal.

7. The signal processing device according to claim 5, wherein the second circuit comprises:
    a first analog-to-digital (A-D) converter and a first demodulation and down-conversion (DMDC) circuit, configured to generate a first intermediate signal according to the first output signal and the second output signal; and
    a first computing circuit, configured to generate the first control signal according to the first intermediate signal and the first DPD signal,
    wherein, the first computing circuit, the first A-D converter and the first DMDC circuit are disposed on the first output feedback path.

8. The signal processing device according to claim 7, wherein the first A-D converter has a first sampling frequency, and the first sampling frequency is greater than or equal to twice of the first input BW.

9. The signal processing device according to claim 7, wherein the first computing circuit performs a multi-input and multi-output (MIMO) indirect learning algorithm according to the first intermediate signal and the first DPD signal.

10. The signal processing device according to claim 9, wherein the first computing circuit performs a least square (LS) operation to generate the first control signal, and adjusts filter-coefficients of the first PD circuit according to the first control signal.

11. The signal processing device according to claim 1, wherein the first circuit comprising:
    a second PD circuit, configured to receive the first input signal through the first input transmission path, receive the second input signal through the second input transmission path, generate the second DPD signal according to the first input signal, the second input signal and the second control signal, and transmit the second DPD signal to the second circuit through the second feedback path; and
    a second digital-to-analog (D-A) converter and a second modulation and up-conversion (MUC) circuit, configured to convert the second DPD signal into the second PD signal,
    wherein, the second PD circuit, the second D-A converter and the second MUC circuit are disposed on the second input transmission path.

12. The signal processing device according to claim 11, wherein the second PD circuit performs a coupling DPD (CP-DPD) process according to the first input signal, the second input signal and the second control signal.

13. The signal processing device according to claim 11, wherein the second circuit comprises:
- a second analog-to-digital (A-D) converter and a second first demodulation and down-conversion (DMDC) circuit, configured to generate a second intermediate signal according to the first output signal and the second output signal; and
- a second computing circuit, configured to generate the second control signal according to the second intermediate signal and the second DPD signal,
- wherein, the second computing circuit, the second A-D converter and the second DMDC circuit are disposed on the second output feedback path.

14. The signal processing device according to claim 13, wherein the second A-D converter has a second sampling frequency, and the second sampling frequency is greater than or equal to twice of the second input BW.

15. The signal processing device according to claim 13, wherein the second computing circuit performs a multi-input and multi-output (MIMO) indirect learning algorithm according to the second intermediate signal and the second DPD signal.

16. The signal processing device according to claim 15, wherein the second computing circuit performs a least square (LS) operation to generate the second control signal, and adjusts filter-coefficients of the second PD circuit according to the second control signal.

* * * * *